United States Patent
Zhou et al.

(10) Patent No.: US 11,972,507 B2
(45) Date of Patent: Apr. 30, 2024

(54) ORTHOPHOTO MAP GENERATION METHOD BASED ON PANORAMIC MAP

(71) Applicant: NANJING POLAGIS TECHNOLOGY CO. LTD, Nanjing (CN)

(72) Inventors: Liangchen Zhou, Nanjing (CN); Zhengyuan Lv, Nanjing (CN); Guonian Lv, Nanjing (CN)

(73) Assignee: NANJING POLAGIS TECHNOLOGY CO. LTD, Nanjing (CN)

( * ) Notice: Subject to any disclaimer, the term of this patent is extended or adjusted under 35 U.S.C. 154(b) by 189 days.

(21) Appl. No.: 17/440,221

(22) PCT Filed: Apr. 3, 2019

(86) PCT No.: PCT/CN2019/081225
§ 371 (c)(1),
(2) Date: Sep. 17, 2021

(87) PCT Pub. No.: WO2020/199153
PCT Pub. Date: Oct. 8, 2020

(65) Prior Publication Data
US 2022/0164999 A1    May 26, 2022

(51) Int. Cl.
*G06T 11/00* (2006.01)
*G06T 7/60* (2017.01)
(Continued)

(52) U.S. Cl.
CPC ............... *G06T 11/00* (2013.01); *G06T 7/60* (2013.01); *G06T 7/70* (2017.01); *G06T 15/205* (2013.01);
(Continued)

(58) Field of Classification Search
CPC .......... G06T 17/05; G06T 2207/10028; G06T 2207/10032; G06T 7/70; G06T 7/73;
(Continued)

(56) References Cited

U.S. PATENT DOCUMENTS

| 10,235,787 B2 | 3/2019 | Lynch |
| 2010/0091017 A1* | 4/2010 | Kmiecik ................ G01C 11/02 348/148 |

(Continued)

FOREIGN PATENT DOCUMENTS

| CN | 101681525 A | 3/2010 |
| CN | 104133874 A | 11/2014 |

(Continued)

OTHER PUBLICATIONS

Veh, Georg. "Tutorial (Beginner level): Orthophoto and DEM Generation with Agisoft PhotoScan Pro 1.1 (with Ground Control Points)." (2015). Accessed on web Jul. 28, 2023 at https://epic.awi.de/id/eprint/38813/ (Year: 2015).*

*Primary Examiner* — Xiao M Wu
*Assistant Examiner* — Scott E Sonners
(74) *Attorney, Agent, or Firm* — PROI Intellectual Property US; Klaus Michael Schmid

(57) ABSTRACT

Disclosed is an orthophoto map generation method based on a panoramic map, the method comprising: overlapping and fusing a panoramic map and panoramic field depth data when the panoramic map is photographed, such that each pixel of the panoramic map has a corresponding field depth value; acquiring a pitch angle and azimuth angle of a reference pixel relative to a photographing device, and in conjunction with a 360 degree feature of a panorama, calculating an azimuth angle and pitch angle, relative to a camera, of an object represented by each pixel; in conjunction with calculation results and geographic coordinates, determined by a positioning device when the panoramic map
(Continued)

is photographed, of the camera, calculating a geographic position corresponding to the object represented by each pixel to form point cloud data.

10 Claims, 1 Drawing Sheet

(51) Int. Cl.
  *G06T 7/70*   (2017.01)
  *G06T 15/20*  (2011.01)
  *H04N 23/698* (2023.01)
(52) U.S. Cl.
  CPC .  *H04N 23/698* (2023.01); *G06T 2207/20068* (2013.01); *G06T 2207/30244* (2013.01); *G06T 2210/56* (2013.01)
(58) Field of Classification Search
  CPC ........... G06T 2207/30184; G06T 17/00; G06T 2200/08; G06T 2207/30244; G06T 7/97; G06T 19/20; G06T 7/11; G06T 15/20; G06T 3/4038; G06T 7/55; G06T 7/593; G06T 7/33; G06T 2200/04; G06T 15/205; G06T 7/80; B64U 2101/30; G06V 20/176; G06V 20/13; H04N 23/698; H04N 23/90; G01C 11/04; G01C 11/06
  See application file for complete search history.

(56) References Cited

U.S. PATENT DOCUMENTS

| | | | |
|---|---|---|---|
| 2011/0187704 A1* | 8/2011 | Chen | G06T 17/05 |
| | | | 345/419 |
| 2012/0076358 A1 | 3/2012 | Meadow et al. | |
| 2020/0098135 A1* | 3/2020 | Ganjineh | G06F 16/29 |
| 2020/0372708 A1* | 11/2020 | Sun | G06T 19/003 |

FOREIGN PATENT DOCUMENTS

| | | | | |
|---|---|---|---|---|
| CN | 104156969 A | 11/2014 | | |
| CN | 107545537 A | 1/2018 | | |
| WO | WO-2018104700 A1 * | 6/2018 | ........... | G06T 3/4038 |

* cited by examiner

ORTHOPHOTO MAP GENERATION METHOD BASED ON PANORAMIC MAP

TECHNICAL FIELD

The present invention pertains to the field of computers, and particularly relates to an orthophoto map generation method based on panoramic map.

BACKGROUND ART

A panoramic map is a form of image expression that captures image information of an entire scene by means of a professional camera, uses software to piece together pictures and expresses the surrounding environment in a wide-angle form. Panoramic maps are widely used in the fields of painting and photography and have the characteristics of complete information and real scenes. 360-degree real scenes obtained through software processing can give people an immersive sense of three-dimensional space, and are highly interactive. Compared with the three-dimensional animation of scenes, panoramic maps have the advantages of a short production cycle and high cost performance.

A digital orthophoto map (DOM) is image data generated by using a digital elevation model to correct the projection difference of a scanned and processed digital aerial photograph pixel by pixel, then mosaic according to the image and clip according to the range of the map. The current image sources are mainly satellite sensors or high-altitude airborne cameras, their production costs are often high, and they generally cannot reflect the ground features under tree canopies in densely-treeed areas.

SUMMARY OF THE INVENTION

An object of the present invention is to solve the limitation of conventional digital orthophoto maps, which cannot reflect the detailed information of the ground features blocked by trees (or by other complex high-density obstructions), and to provide an orthophoto map generation method based on panoramic map. Real positions of objects in the space, which are represented by pixels in a panorama, are calculated from a panoramic map containing ample scene information and displayed in a wide-angle form, in conjunction with the photographing position of the panoramic map, the azimuth of the reference pixel (the azimuth angle and pitch angle of the object represented by the pixel at the center of the panoramic map relative to the camera) as well as corresponding field depth data, point clouds are formed, point clouds in the ground area are screened, and an orthophoto map is generated according to certain resolution.

In order to achieve the foregoing technical object, the present invention adopts the following technical solution:

An orthophoto map generation method based on panoramic map, comprising the following steps:

Step 1: generating point cloud data in a panoramic map range according to a panoramic map, field depth data and camera parameters (latitude and longitude coordinates, pitch angle and azimuth angle of a photographing device during photographing).

Step 2: generating point cloud data corresponding to all panoramic maps in the target area according to the method at step 1.

Step 3: projecting the point cloud data obtained at step 2 onto a plane and generating on demand an orthophoto map with a specified resolution, projection information and geographic coordinate information.

The latitude and longitude coordinates of the photographing device can be recorded in the WGS84 coordinate system commonly used by GPS, and its position accuracy will have a direct bearing on the accuracy of the finally generated result. When the panoramic map is taken, the field depth data corresponding to the panorama taken by the photographing device can be saved. The finer the record of field depth data is, the closer to the truth the generated point cloud effect will be.

The finer the record of field depth data is, the closer to the truth the generated point cloud effect will be.

As a further improvement of the present invention, the point cloud data generation step at step 1 comprises:

Overlapping a pixel value corresponding to the pixel of each row or column number in the panoramic map and depth data corresponding to the pixel of the corresponding row or column number in the field depth data to obtain a panoramic map containing the field depth data;

In conjunction with coordinates, an azimuth angle and a pitch angle of a photographing device during photographing, calculating real geographic position data of an object represented by each pixel in the panoramic map containing the field depth data, and obtaining point cloud data containing the pixel value of each pixel and the real geographic position data of the object represented by the pixel. Further, the real geographic position data include a longitude and latitude position of the object represented by the pixel and a height relative to the position of the photographing device.

As a further improvement of the present invention, the step of in conjunction with coordinates, an azimuth angle and a pitch angle of a photographing device during photographing, calculating real geographic position data of an object represented by each pixel in the panoramic map containing the field depth data comprises: selecting a certain pixel of the panoramic map as a reference pixel, and respectively acquiring a real azimuth angle and pitch angle of the pixel relative to a photographing position based on an azimuth angle and pitch angle of an object represented by the reference pixel relative to a camera, in conjunction with a 360 degree feature and according to a row number deviation and column number deviation between each pixel data and the reference pixel.

As a further improvement of the present invention, at step 2, the generated point cloud data are eliminated; and the objects of elimination are point clouds that are higher than the photographing center and/or too far from the photographing center. Further, a value within 30 m to 100 m from the photographing center is selected as a threshold, and point cloud data with a distance of more than the threshold from the photographing center are eliminated. Further, an effective area of each independent panoramic map is established according to the adjacency relation between panoramic maps, and point cloud data outside the effective area of each panoramic map are eliminated.

Further, point clouds are eliminated based on the principle of adjacent retention and priority is given to retaining point clouds adjacent to the photographing center in the panoramic map; and when point cloud overlapping occurs between the current panoramic map and an adjacent panoramic map, priority is given to retaining point clouds closer to the position of the photographing center of the current panoramic map.

As a further improvement of the present invention, at step 3, an appropriate map resolution is selected for the point cloud data set obtained at step 2 according to the density and application requirements of the point clouds to generate an orthophoto map containing projection information and geographic coordinate information.

As a further improvement of the present invention, at step 3, a range of the point cloud set acquired at step 2 is calculated, the number of rows and columns of a final orthophoto map is calculated according to a distance represented by the set pixel, grid data are created, a pixel value of the point cloud pixel falling within the demarcated grid is assigned to the grid where the point cloud is located, to acquire an orthophoto map.

The method provided by the present invention can use panoramic data provided by current Internet platforms or collected by professional panorama collecting devices to generate orthophoto maps, has a low use cost and can supplement image content to the areas with problems such as blur road data and tree blockage in the orthophoto maps provided by the current platforms and help the user to acquire image information in a better way. For example, when being used in road information digitalization, the method can solve user's problems of unknown road information and collection failure caused by blur orthophoto maps or tree blockage and provide clear and high-precision road maps for the user.

DETAILED DESCRIPTION

The technical solution of the present invention is further described below in detail in conjunction with the accompanying drawings and embodiments:

Embodiment 1

This example uses Windows10 as an operating system environment, Visual Studio 2013 as a development environment, C# as a development language, and color map panorama data provided by Google Map API as a data source to specifically describe a flow of the orthophoto map generation method based on panoramic map in the present invention.

Figure 1:
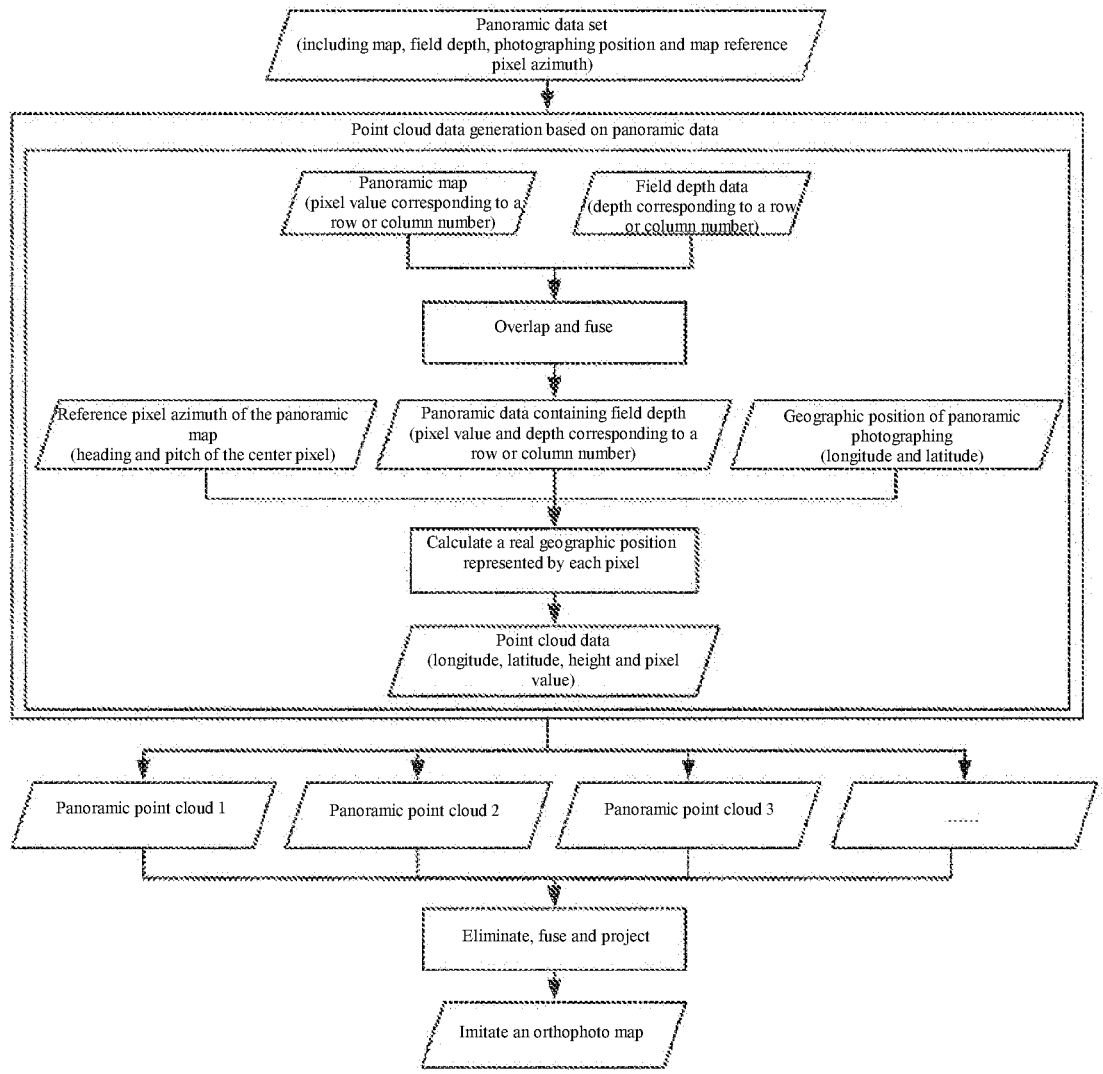
FIG. 1 is a flow diagram of embodiment 1 of the present invention.

As shown in FIG. 1, the orthophoto map generation method based on panoramic map establishes an orthophoto map generation program HDMap.exe based on panoramic map according to the following steps:

Step 1, generating color point cloud data in the panoramic range according to the panoramic map, field depth data and camera parameters (the coordinates, pitch angle and azimuth angle of the camera during photographing).

Step 2, generating color point cloud data corresponding to all panoramic maps in the target area according to the method at step 1, and eliminating and fusing the point cloud data according to a certain rule to form a complete color point cloud set covering the target area.

Step 3, projecting the point cloud data obtained at step 2 onto a plane and generating on demand an orthophoto map with a specified resolution and geographic coordinates.

After HDMap.exe is completed and started, a user configuration interface is entered, a task path (which shall internally contain an orderly street panorama ID for this time) of this task, a cache path (for caching point cloud texts, etc.), a resolution of output images, and a final output path of the images are set, and a generation button is clicked on to start performing this orthophoto generation task. After the performance of the generation task is completed, a task completion prompt pops up. Now a corresponding orthophoto map can be found under the output directory.

The specific implementation steps are as follows:

Step 1, generating point cloud data in a capture range of the panorama according to the panoramic map, the geographic position during photographing, a reference azimuth, and corresponding field depth data.

(1) Data Acquisition

The program will acquire the specified panoramic map, the geographic position during photographing, a reference azimuth, and corresponding field depth data according to the given panorama ID, which are used for subsequent orthophoto generation.

(2) Generation of Panoramic Data Containing a Field Depth

The pixels and field depth data of panoramic maps are traversed row by row and column by column, and the row numbers, column numbers, color values and field depth data of the panoramas are recorded one by one in the text.

```
for (int col = 0; col <tileWidth; col++)
{
    for (int row = 0; row <tileHeight; row++)
    {
        Int32 rValue = tileDepth.bmp.GetPixel(col, row).R;
        Int32 gValue = tileDepth.bmp.GetPixel(col, row).G;
        Int32 bValue = tileDepth.bmp.GetPixel(col, row). B;
        double depthValue = tileDepth.getPixelDepth(col, row,devieHight ,
      out colInImage, out rowInImage);
        if (depthValue<0)
        {
            continue;
        }
  bw.Write((Int32)colInImage);
  bw.Write((Int32)rowInImage);
  bw.Write(rValue);
  bw.Write(gValue);
  bw.Write(bValue);
  bw.Write(depthValue);
    }
}
```

(3) Generation of Point Cloud Data

According to the reference azimuth of the panoramic map (here it is the azimuth angle of the pixel at the image center of the panoramic map), a real azimuth angle (Heading) of the pixel relative to the photographing position can be calculated in conjunction with a 360 degree feature and according to the row number deviation between each pixel data and a middle pixel. Likewise, a real pitch angle (Pitch) of the pixel can be calculated according to the column number deviation between each pixel and the middle pixel.

```
double heading = 2.0 * (curColRowRGBD.col − curZoomWidth / 2) /
curZoomWidth *180.0 + curPanoInfo.OriginalHeading;
//Heading not in the range of 0 to 360 is corrected
while (heading < 0)
{
  heading += 360;
```

```
}
while (heading > 360)
{
  heading -= 360;
}
//The pitch of the current pixel is calculated
double pitch = 1.0 * (curZoomHeight / 2 - curColRowRGBD.row) / (curZoomHeight)
* Math.PI;
```

The longitude and latitude position of each pixel can be calculated according to the pixel heading calculated by the foregoing method, the field depth value fused in the panoramic data (i.e., the distance from the pixel to the photographing center) and the longitude and latitude information of the photographing center.

```
private double EARTH_RADIUS_L = 6378137;
private double EARTH_RADIUS_S = 6356752.3142;
private double EARTH_FLATTENING = 1 / 298.2572236;
///The longitude and latitude of another point are calculated
///</summary>
///<param name="lon">/longitude</param>
///<param name="lat">/latitude</param>
///<param name="heading">/heading</param>
///<param name="dist">/distance (meter)</param>
///<returns></returns>
public string computerThatLonLat(double lon, double lat, double heading, double
dist)
    {
        double alpha1 = Degree2Rad(heading);
        double sinAlpha1 = Math.Sin(alpha1);
        double cosAlpha1 = Math.Cos(alpha1);
        double tanU1 = (1 - EARTH_FLATTENING) * Math.Tan(Degree2Rad(lat));
        double cosU1 = 1 / Math.Sqrt((1 + tanU1 * tanU1));
        double sinU1 = tanU1 * cosU1;
        double sigma1 = Math.Atan2(tanU1, cosAlpha1);
        double sinAlpha = cosU1 * sinAlpha1;
        double cosSqAlpha =1 - sinAlpha * sinAlpha;
        double uSq = cosSqAlpha * (EARTH_RADIUS_L * EARTH_RADIUS_L -
EARTH_RADIUS_S * EARTH_RADIUS_S) / (EARTH_RADIUS_S *
EARTH_RADIUS_S);
        double A = 1 + uSq / 16384 * (4096 + uSq * (-768 + uSq * (320 - 175 *
uSq)));
        double B = uSq / 1024 * (256 + uSq * (-128 + uSq * (74 - 47 * uSq)));
        double cos2SigmaM = 0;
        double sinSigma = 0;
        double cosSigma = 0;
        double sigma = dist / (EARTH_RADIUS_S * A), sigmaP = 2 *Math.PI;
        while (Math.Abs(sigma - sigmaP) > 1e-12)
        {
          cos2SigmaM = Math.Cos(2 *sigma1 + sigma);
          sinSigma = Math.Sin(sigma);
          cosSigma = Math.Cos(sigma);
          double deltaSigma = B * sinSigma * (cos2SigmaM + B / 4 * (cosSigma *
(-1 + 2 * cos2SigmaM * cos2SigmaM)
          - B / 6 * cos2SigmaM * (-3 + 4 * sinSigma * sinSigma) * (-3 + 4 *
cos2SigmaM * cos2SigmaM)));
            sigmaP = sigma;
            sigma = dist / (EARTH_RADIUS_S * A) + deltaSigma;
        }
        double tmp = sinU1 * sinSigma - cosU1 * cosSigma * cosAlpha1;
        double lat2 = Math.Atan2(sinU1 * cosSigma + cosU1 * sinSigma * cosAlpha1,
        (1 - EARTH_FLATTENING) * Math.Sqrt(sinAlpha * sinAlpha + tmp *
tmp));
        double lambda = Math.Atan2(sinSigma * sinAlpha1, cosU1 * cosSigma -
sinU1 * sinSigma * cosAlpha1);
        double C = EARTH_FLATTENING / 16 * cosSqAlpha * (4 +
EARTH_FLATTENING * (4 - 3 *cosSqAlpha));
        double L = lambda - (1 - C) * EARTH_FLATTENING * sinAlpha
            * (sigma + C * sinSigma * (cos2SigmaM + C * cosSigma * (-1 + 2 *
cos2SigmaM * cos2SigmaM)));
        double revAz = Math.Atan2(sinAlpha, -tmp); // final bearing
        double lng = lon + Rad2Degree(L);
        return (Rad2Degree(lat2) + "," + lng);
    }
```

The height of each pixel relative to the photographing device can be calculated according to the pixel pitch calculated by the foregoing method, and the field depth value fused in the panoramic data (i.e., the distance from the pixel to the photographing center)

double z=Math.Sin(pitch)*curColRowRGBD.
        depthValue;

By the foregoing method, the longitude, latitude, height and color value, i.e., point cloud data, of each pixel can be obtained.

Step 2, generating orderly panorama point cloud data of a road section by the method at step 1, eliminating (clipping) the point cloud data according to a certain rule, and retaining only the effective point clouds generated by a plurality of orderly panoramas, thereby forming a complete point cloud set (splicing) of a road section and storing the set in the form of text.

Figure 2:
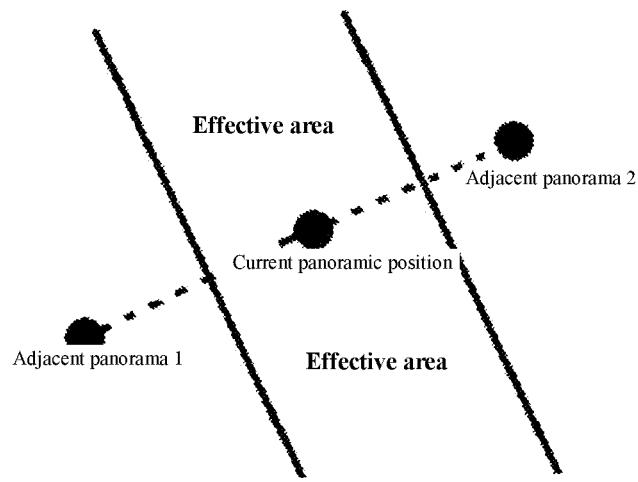
FIG. 2 is an example for division of an effective area in a point cloud generation example.

The rule for removal of point clouds includes: to far from the photographing center, higher than the photographing device, and not in the effective range (as shown in FIG. 2, an effective range is demarcated according to the perpendicular bisector of the connecting line between the current panorama and an adjacent panorama, and point clouds generated by the current panoramic map and crossing the effective range are eliminated). In this embodiment, 100 is defined as a threshold, and the point clouds more than 100 m from the photographing center are eliminated.

```
//Remove if the field depth is too large
if (curColRowRGBD.depthValue> 100)
{
    continue;
}
double pitch = 1.0 * (curZoomHeight / 2 - curColRowRGBD.row) / (curZoomHeight) *Math.PI;//pitch
//Remove if higher than the photographing device
double z = Math Sin(pitch) * curColRowRGBD.depthValue;//height
if (z>0)
{
    continue;
}
//Remove if not in the effective range
boolisInright = false;
foreach (Vector[ ] vectors in listBoundaryVector)
{
    if (vectorOperation.isInLineRight(vectors[0], vectors[1], curLonLngVector))
    {
        isInright = true;
        break;
    }
}
```

Step 3, projecting the point cloud data obtained at step 2 onto a plane to generate a map in the format of TIF with an appropriate resolution and geographic information, i.e., an orthophoto map.

A real geographic range expressed by the final image is determined according to the point cloud bounding rectangle obtained at step 2, the number of rows and columns that the orthophoto map shall have is calculated according to the initially set real distance represented by each pixel, TIF images are created in conjunction with a GDAL class library of C#, and a point cloud color value falling within the demarcated grid is assigned to the grid.

```
public void CloudPoints2Tiff(string CloudPointsPath, string headPath, string tiffPath, int zoom, double pixelDis)
{
    CloudPointExtentcpsExtent = new CloudPointExtent( );
    //Read a header file
    cpsExtent.ReadHeadFile(headPath);
    //Extents of longitude and latitude
    double distX = cpsExtent.maxX - cpsExtent.minX;
    double distY = cpsExtent.maxY - cpsExtent.minY;
    //Vertical and horizontal distances
    double realDisX = getEarthCoordinates.GetDistance(cpsExtent.minY,
cpsExtent.minX, cpsExtent.minY, cpsExtent.maxX);
    double realDisY = getEarthCoordinates.GetDistance(cpsExtent.minY,
cpsExtent.minX, cpsExtent.maxY, cpsExtent.minX);
    //Number of vertical and horizontal pixels
intxCount = Convert.ToInt32(realDisX / pixelDis);
intyCount = Convert.ToInt32(realDisY / pixelDis);
    //Number of image rows and columns
intimgWidth = xCount;
intimgHeight = yCount;
    //Corresponding scales
    double xScale = xCount / distX;
    double yScale = yCount / distY;
GdalToolgdalTool = new GdalTool( );
gdalTool.createSimpleTiff(tiffPath, imgWidth, imgHeight, cpsExtent);
StartRead(CloudPointsPath);
CloudPointcurCloudPoint = null;
int col = 0;
int row = 0;
    while ((curCloudPoint = GetNextCloudPoint( )) != null)
    {
        row = Convert.ToInt32((cpsExtent.maxY - curCloudPoint.y) * yScale);//row number of the current point
        col = Convert.ToInt32((curCloudPoint.x - cpsExtent.minX) * xScale);// column number of the current point
        if (col >= imgWidth)
        {
            col = col - 1;
```

```
        }
        if (row >= imgHeight)
        {
            row = row - 1;
        }
        gdalTool.setPiexl(col, row, curCloudPoint.rValue, curCloudPoint.gValue,
curCloudPoint.bValue);
        }
    gdalTool.finshTiff( );
    EndRead( );
}
```

The invention claimed is:

1. An orthophoto map generation method based on panoramic map, wherein the method comprises the following steps:
   step 1: generating point cloud data in a panoramic map range according to a panoramic map, field depth data and camera parameters;
   the camera parameters including longitude and latitude coordinates, pitch angle and azimuth angle of a photographing device during photographing;
   step 2: generating point cloud data corresponding to all panoramic maps in a target area according to the method at step 1; and
   step 3: projecting the point cloud data obtained at step 2 onto a plane to generate an orthophoto map with a specified resolution, projection information and geographic coordinate information;
   wherein at step 1, the point cloud data generation step comprises:
   overlapping a pixel value corresponding to a pixel of each row or column number in the panoramic map and depth data corresponding to a pixel of the corresponding row or column number in the field depth data to obtain a panoramic map containing the field depth data; and
   in conjunction with coordinates, an azimuth angle and a pitch angle of a photographing device during photographing, calculating real geographic position data of an object represented by each pixel in the panoramic map containing the field depth data, and obtaining point cloud data containing the pixel value of each pixel and the real geographic position data of the object represented by each pixel.

2. The orthophoto map generation method based on panoramic map according to claim 1, wherein the real geographic position data include a longitude and latitude position of the object represented by the pixel and a height relative to the position of the photographing device.

3. The orthophoto map generation method based on panoramic map according to claim 1, wherein the step of in conjunction with coordinates, an azimuth angle and a pitch angle of a photographing device during photographing, calculating real geographic position data of an object represented by each pixel in the panoramic map containing the field depth data comprises: selecting a certain pixel of the panoramic map as a reference pixel, and respectively acquiring a real azimuth angle and pitch angle of the pixel relative to a photographing position based on an azimuth angle and pitch angle of an object represented by the reference pixel relative to a camera, in conjunction with a 360 degree feature and according to a row number deviation and column number deviation between each pixel data and the reference pixel.

4. The orthophoto map generation method based on panoramic map according to claim 1, wherein at step 2, the generated point cloud data are eliminated; and the objects of elimination are point clouds that are higher than the photographing center and/or too far from the photographing center.

5. The orthophoto map generation method based on panoramic map according to claim 4, wherein a value within 30 m to 100 m from the photographing center is selected as a threshold, and point cloud data with a distance of more than the threshold from the photographing center are eliminated.

6. The orthophoto map generation method based on panoramic map according to claim 5, wherein an effective area of each independent panoramic map is established according to the adjacency relation between panoramic maps, and point cloud data outside the effective area of each panoramic map are eliminated.

7. The orthophoto map generation method based on panoramic map according to claim 4, wherein an effective area of each panoramic map is established according to the adjacency relation between panoramic maps, and point cloud data outside the effective area of each panoramic map are eliminated.

8. The orthophoto map generation method based on panoramic map according to claim 7, wherein point clouds are eliminated based on the principle of adjacent retention and priority is given to retaining point clouds adjacent to the photographing center in the panoramic map; and when point cloud overlapping occurs between a current panoramic map and an adjacent panoramic map, priority is given to retaining point clouds closer to the position of the photographing center of the current panoramic map.

9. The orthophoto map generation method based on panoramic map according to claim 1, wherein at step 3, an appropriate map resolution is determined for the point cloud data set obtained at step 2 according to any density and application requirements of the point clouds to generate an orthophoto map containing projection information and geographic coordinate information.

10. The orthophoto map generation method based on panoramic map according to claim 1, wherein at step 3, a range of one or more of any point cloud set acquired at step 2 is calculated, a number of rows and columns of a final orthophoto map is calculated according to a distance represented by a set pixel, grid data are created, and a pixel value of a point cloud pixel falling within a demarcated grid is assigned to a grid where the point cloud is located, to acquire an orthophoto map.

* * * * *